United States Patent [19]
Greutman et al.

[11] 3,731,300
[45] May 1, 1973

[54] DIGITAL TO SIN/COS CONVERTER

[75] Inventors: Weldon Wayne Greutman, Hicksville, Ohio; Isacc Roger Studebaker, Fort Wayne, Ind.

[73] Assignee: International Telephone and Telegraph Corporation, Nutley, N.J.

[22] Filed: Aug. 13, 1971

[21] Appl. No.: 171,577

[52] U.S. Cl. ........340/347 DA, 340/347 SY, 235/197
[51] Int. Cl. .............................................H03k 13/02
[58] Field of Search .................340/347 DA, 347 SY; 235/197, 154

[56] References Cited

UNITED STATES PATENTS

| | | | |
|---|---|---|---|
| 3,349,230 | 10/1967 | Hartwell et al. | 340/347 DA |
| 3,609,320 | 9/1971 | Tripp | 340/347 DA |
| 3,514,775 | 5/1970 | Tripp | 340/347 DA |
| 3,493,965 | 2/1970 | Hargrove | 340/347 DA |
| 3,488,653 | 1/1970 | Rasche | 340/347 DA |
| 3,371,334 | 2/1968 | Asher et al. | 340/347 DA |

*Primary Examiner*—Charles D. Miller
*Attorney*—C. Cornell Remsen et al.

[57] ABSTRACT

In a radar system, an arrangement for converting digital information representative of the rotational (azimuthal) position of the radar antenna to sine and cosine of azimuth waveforms for use in a display such as a plan position indicator. Azimuth change pulses indicative of the antenna's rotation and azimuth reference pulses indicating the 0° reference direction are applied to a first counter, the individual outputs of each stage of which are in turn coupled to a comparator arrangement. The state of the first counter is compared with that of a second counter which is fed by a pulse source standard. The output of the last stage of the second counter is treated and filtered to provide a pure sinusoidal reference waveform to be sampled in a sample/hold detector arrangement. From the comparator arrangement sampling pulses are derived in accordance with the rotational position of the antenna relative to the digital reference as represented by the count in the second counter, with these sampling pulses then being applied to the sample/hold detector in order to produce a sine of azimuth waveform. A cosine of azimuth waveform is also derived via an adder stage in conjunction with the comparator arrangement, which adder counts the equivalent of 90° from the first derived sine sampling pulse to produce the priming condition for a cosine sampling pulse.

7 Claims, 2 Drawing Figures

INVENTORS
WELDON W. GREUTMAN
BY ISSAC R. STUDERBAKER

AGENT

DIGITAL TO SIN/COS CONVERTER

BACKGROUND OF THE INVENTION

This invention relates to a digital-to-sin/cos conversion arrangement, and more particularly to a radar resolver arrangement for converting azimuth change pulses (ACP's) /azimuth reference pulses (ARP's) to sine and cosine signals representative of for example the rotation (azimuth) of the radar antenna.

Generally the type of conversion required to achieve sin/cos output information representative of the azimuthal position of the radar antenna, for purposes of display for example via a plan position indicator (PPI), depends on the type of signals generated at the antenna itself which carry this positional information. In most cases a transmitting synchro accompanies the radar antenna which yields three-phase output information to be converted to sin/cos of azimuth; such a conversion arrangement is disclosed for instance in our co-pending U.S. Pat. application Ser. No. 168,246 filed Aug. 2, 1971, (Greutman et al. 5–5), the disclosure of which, insofar as it is pertinent to the disclosure of this invention is incorporated herein by reference.

However, in cases where the information to be converted to sin/cos waveforms is generated in digital form at the antenna, conversion considerations commensurate therewith take on distinctly different form. This is particularly illustrated wherein the instantaneous azimuthal position of the radar antenna is given by azimuth change pulses (ACP's) which are referenced upon each complete rotation of the antenna by an azimuth reference pulse (ARP), which by convention may represent the direction of true North. Prior art arrangements providing ACP-to-sin/cos of azimuth conversion require for instance the cumbersome procedure of first computing the digital sin/cos values and then applying same to conventional digital-to-analog converters.

SUMMARY OF THE INVENTION

It is therefore a principle object of this invention to provide a unique arrangement for converting digital type positional information to sin/cos positional information, which obviates the above-mentioned cumbersome procedures of the prior art.

It is another object of this invention to provide the above-defined conversion by comparing the phase relation of the digital positional information to a standard via a comparator-counter arrangement in order to provide sampling of a pure reference sinusoidal waveform derived from the arrangement.

It is a further object of this invention to provide the above-defined type of conversion free from spurious pulse generations which may arise in the conversion process.

According to the broader aspects of the invention, there is provided a digital to sin/cos conversion arrangement including means for generating a sampleable sinusoidal waveform and means for comparing the phase relation of digital positional information with a standard in order to provide sampling of the generated sinusoidal waveform. A feature of the invention is that digital antenna positional information in the form of ACP and ARP pulses is treated by relating the digital antenna positional information to a standard wherein the respective information and standard signal sources are each applied to a linear counter with the phase relation of the counters being compared in order to generate pulses for sampling a sinusoidal waveform derived from one of the counters.

A further feature of the invention is that provision is made for digitally providing separate sampling pulses for deriving respectively sine and cosine waveforms indicative of for example a radar antenna's azimuthal position.

BRIEF DESCRIPTIONS OF THE DRAWINGS

The above-mentioned and other objects and features of this invention will become more apparent, and the invention itself better understood, by reference to the following description of specific apparatus taken in conjunction with the accompanying drawings, in which:

FIG. 1 is a block diagram of a ACP/ARP to sin/cos of azimuth conversion arrangement according to the invention, showing also via block symbols only so much of the succeeding sample/hold detecting stage as is necessary for a proper understanding of the invention; and FIG. 2 is a schematic block diagram illustrating the circuitry of the inventive arrangement according to FIG. 1.

DESCRIPTION OF THE PREFERRED EMBODIMENT

Figure 1:
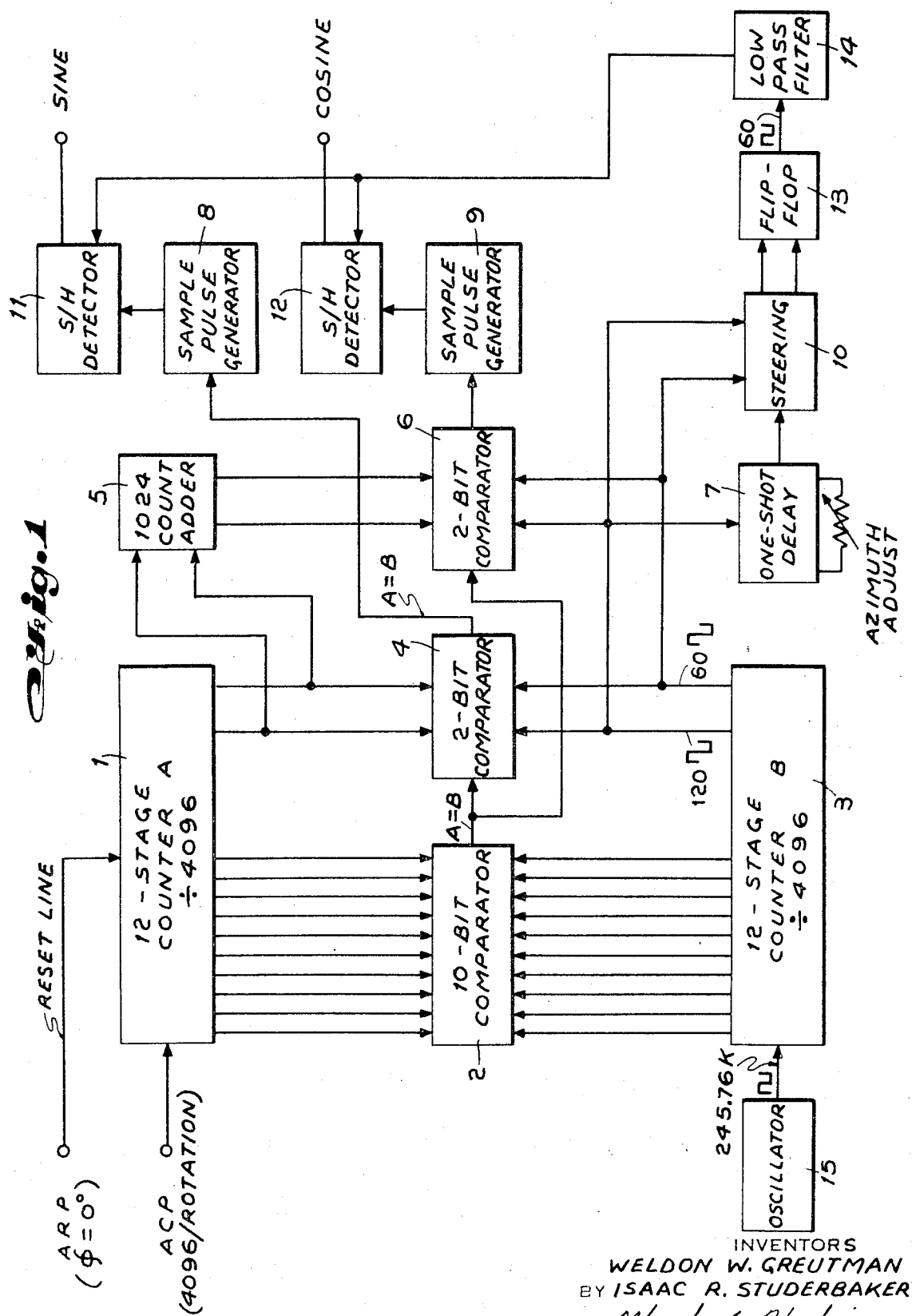

Referring to the figures, a digital to sin/cos converter is illustrated therein in which the ACP/ARP digital signals representative of for example the rotational (azimuth) position of a radar antenna are converted to sine and cosine positional information waveforms. In the block diagram of FIG. 1, azimuth change pulses (ACP's) and azimuth reference pulses (ARP's), which are generated in conjunction with the azimuthal position of a radar antenna by conventional means not shown, are fed to 12-stage counter 1, also labeled as counter A. The ACP and ARP rates in the example to be described are the standard rates utilized by the Federal Aviation Administration (FAA), namely $2^{12}$ or 4,096 ACP pulses per single rotation and 1 ARP (North pulse) per rotation. It is easily seen from the above that each ACP represents 360° 4,096 or 0.088° of rotation, and that 12 stages are required in counter A for the 12 powers of two associative of a rotational rate of 4,096 pulses/rotation. In operation, only the initial ARP is required as a beginning reset of counter A. Thereafter the counter automatically resets itself upon each full rotational count. With the ACP's being fed to counter A subsequent to the initial reset, a separate output indicative of each stage of the counter is fed to a comparator arrangement consisting of a 10-bit comparator 2 and two 2-bit comparators 4 and 6. The overall output of the counter A is a digital representation of the instantaneous azimuth to which the antenna has rotated (antenna heading). In particular, the 10 least significant bits or outputs of counter A (i.e. the 10 lowest powers of two) are fed to the 10-bit comparator 2, and the remaining 2 bits are fed to 2-bit comparator 4.

A digital standard is derived from oscillator 15 which produces in the present example, a square wave output, of 245.76 KHZ; this frequency is equivalent to 60 ×

4096. The oscillator output is applied to a second 12-stage counter 3, designated as counter B in FIG. 1. The 12 outputs of the counter B are in turn applied to the comparator arrangement, with the 10 least significant digits again being applied to the 10-bit comparator 2 and the remaining two digits to the 2-bit comparator 4. The collective output of counter B represents therefore a digitally coded reference. Thus the counter B outputs applied to comparator 4 are respectively 120HZ and 60HZ, while the outputs applied to comparator 2 range from 240HZ at the tenth digit to 122.88 KHz at the least significant digit. The frequency of 245.76 KHz for the oscillator 15 output was chosen to yield a 60HZ output from the last (twelfth) stage of counter B in order to coincide with the base frequency used in conventional synchro to azimuth sin/cos conversion arrangements. Therefore, a change-over of a conventional synchro three-phase information display system to a digital antenna positional information system, or vice versa, requires merely the interchange of the synchro to sin/cos converter with the ACP/ARP to sin/cos converter. It is to be understood however that any reasonable oscillator frequency may be used.

In the comparison of the 10 least significant digit outputs of counters A and B, an output is produced from 10-bit comparator 2 whenever the reference phase of counter B is identical to the rotational azimuth in counter A, i.e. whenever the two counters contain an equal count. This output from comparator 2 is applied to the 2-bit comparator 4. Comparator 4 is intended to produce an output pulse, i.e. a logical "1", whenever the eleventh and twelfth digits of counters A and B match-up and a signal is present at the output of comparator 2. The pulse output of comparator 4 is in turn fed to a sample pulse generator 8 to derive a sample pulse of predetermined properties for a proper sampling of the pure sinusoidal waveform derived via the inventive arrangement, as described later. The output of sample pulse generator 8 represents the sine sampling pulses for deriving a sine waveform constituting the antenna positional information.

The pure, exactly symmetrical sinusoidal waveform created by the generated sample pulses is derived from the 60Hz and 120Hz output digits of counter B. The 120Hz square wave output triggers a one-shot delay or monostable multivibrator 7 whose output is fed to a steering stage 10 which has for its other input the counter B 60Hz square wave output. Steering stage 10 is in turn coupled to a flip flop 13 in order to control same in producing an exactly symmetrical (pure) 60Hz square wave output. The square wave is then filtered via low pass filter 14 to produce a pure sine wave. Thus the 60Hz output of counter B has been treated by stages 7 and 10 under the control of the 120Hz counter B square wave output to provide a pure sinusoidal reference waveform which is then applied to sample/hold detector stages 11 and 12. By way of for instance sample/hold detector 11, in receiving the sample pulses and the pure sinusoidal reference waveform, the phase of the reference waveform is detected, as is more fully described in the referenced U.S. application. Thus in operation the arrangement detects when the phase of counter B is the same as counter A, and in response thereto a sample pulse is derived to sample the generated pure sinusoidal reference waveform, and thereby provide digital phase detection.

By the use of a second 2-bit comparator, i.e. comparator 6, together with a 1,024 count adder 5, an output i.e. a logical "1" is also developed from comparator 6 at a phase of the sine wave displaced 90° from the previously described "1" output of comparator 4. This is possible as a count of 1,024 represents $2^{10}$ or 90° of azimuth from the reference ARP. In fact, the first 10 bits of counter A are equivalent to one quadrant of rotation, and therefore the 10 least significant digits in counter A are capable of indicating where in a quadrant the rotational position of the radar antenna lies. Moreover, the last 2 bits (the two most significant digits) of counter A are indicative of exactly which quadrant the antenna is positioned, with the last or twelfth digit indicating which hemisphere and the eleventh digit describing which quadrant of that hemisphere. Thus by tapping the last 2 digits of counter A with adder 5, the cosine sample pulses (90° displaced in phase from the sine sample pulses) are thereby derived via 2-bit comparator 6 and sample pulse generator 9. As shown, the cosine sample pulses are applied to the derived pure reference waveform via detector 12 in the same way as previously indicated for the sine sampling. The resultants of detectors 11 and 12 are respectively sine and cosine of azimuth outputs which may for example be applied to a plan position indicator (PPI).

One further point regarding the FIG. 1 block diagram, an azimuth adjustment is shown accompanying the one-shot delay 7. It is desired to have a means for providing a simple and continuous knob adjustment of the inventive arrangement in order to eliminate any deviation of the output information from the exact true position of the antenna. Thus a simple potentiometer arrangement is provided in the circuitry deriving the pure reference sine wave, thereby providing needed adjustment by merely changing the phase of the sampled reference waveform a corresponding amount.

Figure 2:
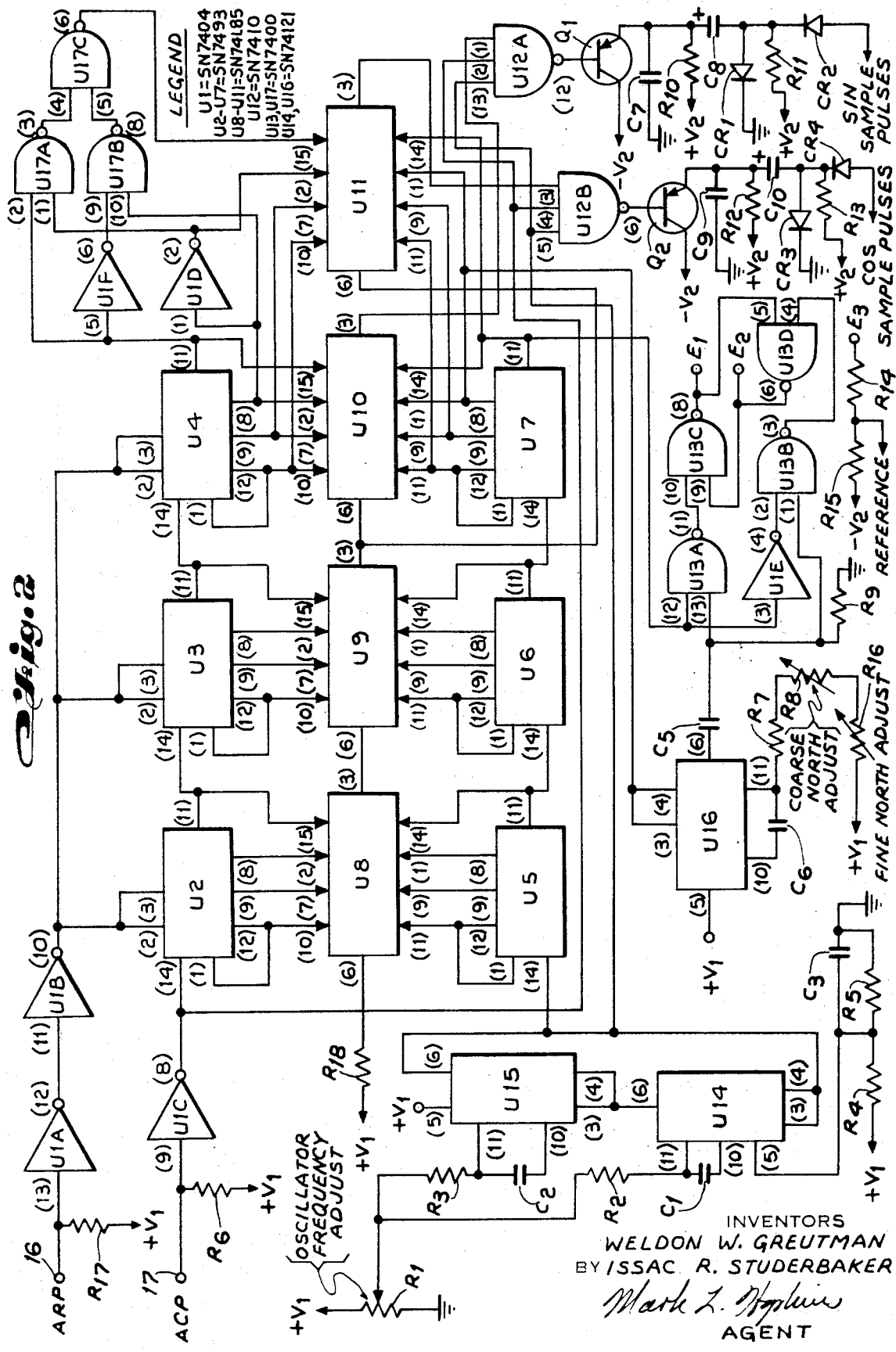

Referring now to FIG. 2, there is illustrated therein a schematic representation of the block diagram of FIG. 1. Azimuth Change Pulses (ACP's) enter at pin 17 and are applied to inverter U1c. The output of inverter U1c goes to pin (14) of U2, which is the input of a 12-bit ripple counter composed of U2, U3, and U4. Azimuth Reference Pulses (ARP's) enter on pin 16 and are routed to the reset inputs of U2, U3, and U4 through a buffer circuit consisting of U1A and U1B. The ACP's are counted in counter U2–U4, wherein the initial condition is determined by resetting the counter at 0° azimuth via an ARP. Thereafter, the phase (or angle) of rotation is registered in counter U2–U4 in binary form. Thus the 12 output bits of U2–U4 represent the ACP count since the last ARP.

Similarly U5–U7 comprise a 12-bit counter. The input to this counter is a square wave of frequency 4,096 × 60 cps or about 246kc. This square wave is generated by a free-running oscillator composed of monostable multivibrators U14–U15. Potentiometer R1 serves to adjust the frequency of the oscillator, and the combination R4-C3 is a sure-starting circuit that inhibits oscillator operation until after the power supply voltage has come up upon turn-on.

The output of the last stage of the counter, i.e. pin (11) of U7, is a square wave of approximately 60 cycles. The output from the previous stage, a 120 cycle square wave at pin (8) of U7, triggers monostable multivibrator U16 whose output pulses at pin (6) trigger flip-flop U13. The output of U13 is a 60 cycle square wave whose phase is adjustable with respect to the 60 cycle square wave present at pin (11) of U7. The adjustment is controlled by potentiometers R8 and R16, which serve as course and fine "North" adjustments respectively, permitting zero degrees on the display to be aligned with the ARP. The square wave output of U13 is level shifted by resistors R14–R15 and is converted to a sine wave via low-pass filter means (not shown), thus providing a pure sinusoidal reference waveform for sampling at a later stage in the system. Integrated circuits U8–U11 are 4-bit comparators which give a logic "1" output when all four pairs of compared inputs are equal. U8–U10 are cascaded together such that the output at pin (3) of U10 is a logic "1" only when the ACP count, i.e. the count in counters U2–U4, equals, the count in the "60-cps" counter U5–U7. Since a given count in the ACP counter U2–U4 appears only once every antenna revolution or about every 3 seconds, while a given count appears in the "60-cps" counter U5–U7 60 times a second, the output approximates a 60 pps train of 4-usec pulses. These pulses are gated through gate U12A and driver Q1 to a sample/hold arrangement, where they serve as sample pulses for a sampling type phase detector. With the antenna stopped, the sample pulses always occur at the same point on the 60-cps square wave, hence the same point on the derived reference sine wave, and the output of the phase detector is a DC level. With the antenna moving, the sample pulse position shifts slowly on the 60-cps sine wave and the ultimate output is a sine wave corresponding to antenna rotation.

The other sweep channel requires a signal proportional to the cosine of the antenna angle. This is accomplished by the comparator chain consisting of U8, U9, and U11. The inputs of U11 are identical to the inputs of U10 except that a fixed count of 1,024 is added by an adder made up of U1F, U1D and U17A–U17C. The output of this comparator (U8, U9 and U11) is a sample pulse 90° out of phase with the sine sample pulse. This "cosine" sample pulse is processed identically to the sine sample pulse by following stages.

Spurious output pulses from the comparators may occur when either the ACP counter, i.e. the counter U2–U4, or the 60-cps counter, i.e. the counter U5–U7, is in transition. This problem is avoided by gates U12A and U12B which inhibit sample pulses during the ACP interval and during the interval that the square wave out of the 246 kc oscillator is at logic "0." Thus the output is inhibited when either counter is in transit. The propagation delay through the ACP counter, nominally 750 nsec., determines the minimum satisfactory ACP width.

In the above there has been described an ACP/ARP to sin/cos of azimuth converter which has application in systems employing digital type antenna rotation information which is required to be converted to sine and cosine type information. In this arrangement azimuth change pulses are counted in a 12-stage counter A, the initial condition thereof being determined by resetting the counter at 0° azimuth with an azimuth reference pulse. Thereafter, the phase (or angle) of rotation is registered in the counter A in binary form. An oscillator output is counted in a second 12-stage counter B, which counts out 4,096 to derive a symmetrical square wave. This square wave is then treated and applied to a low-pass filter to derive a sinusoidal reference waveform. By use of a 12-bit comparator, consisting of a 10-bit comparator and a 2-bit comparator, with a "-counter A - equal-to- counter B" carry from the 10-bit comparator to the 2-bit comparator, a "1" output is derived when the two counters A and B contain an equal count. Thus, a "1" output is derived at an angle (or phase) of the derived reference sine wave as determined by the count contained in the 12-stage counter A. By using a second 2-bit comparator and a 1,024-count adder, a "1" output is also developed at a phase of the sine wave displayed 90° (1,024 counts) from the previous "1" output. These outputs are then used to develop sampling pulses to control sample/hold detectors. Thus sine and cosine of azimuth are obtained from digital input information.

While the principles of this invention have been described with reference to specific apparatus, it is to be understood that this description is made by way of example only and is not to be considered as a limitation on the scope of this invention.

What is claimed is:

1. A digital to sin/cos converter comprising:
   a. first means for digitally representing, by way of a plurality of outputs, positional information in response to equivalent input digital positional information applied thereto;
   b. second means for digitally representing, by way of a plurality of outputs, digital reference information, said second means further providing a symmetrical sinusoidal reference waveform and including a generator having a predetermined output frequency, a first $n$-stage counter arrangement coupled to said frequency generator and providing in response thereto $n$ parallel outputs, and third means, coupled to the $n^{th}$ and with ones of said parallel outputs, which outputs constitute respectively a first desired pulse frequency output in accordance with the predetermined frequency generator input to said first $n$-stage counter and a pulse frequency output substantially twice that of said $n^{th}$ output, for generating in response to said $n^{th}$ and $n-1^{th}$ outputs said symmetrical sinusoidal reference waveform;
   c. fourth means for comparing said plurality of outputs of said first means and second means and for providing sampling pulses responsive to the phase relationship of said first and second means outputs; and
   d. detecting means coupling said sinusoidal reference waveform and said sampling pulses, for providing a resultant sinusoidal output equivalent to the digital information input in response to a sampling of said reference waveform by said sampling pulses.

2. The converter according to claim 1 wherein said third means includes a monostable multivibrator arrangement coupled to said $n-1^{th}$ output for producing a pulse output of predetermined duration in response to the input thereto, steering and flip-flop logic means, coupled to the output of said multivibrator arrangement and to said $n^{th}$ output from said first counter, for generating in response to the inputs thereto a symmetrical square wave output reference, and filter means coupled to said square wave reference for providing a symmetrical sinusoidal reference waveform which is to be sampled by the dual output sampling pulses provided by said fourth means.

3. The convertor according to claim 2 wherein said third means includes adjustment means for adjusting the phase of the sinusoidal reference waveform relative to the digital input positional information in order to provide output sine and cosine waveforms accurately corresponding to the position which the digital input positional information represents.

4. The converter according to claim 1 wherein said first means include a second $n$-stage counter providing n parallel outputs in dependence upon the digital positional information input thereto, and wherein the input information is in the form of a series of rotational change pulses, the outputs of said second $n$-stage counter at any given time thereby representing collectively the digital input rotational position.

5. The converter according to claim 4 wherein said fourth means includes fifth means, comparing the respective parallel outputs of said first and second $n$-stage counters, for providing in response thereto a first pulse output whenever the state of said first and second counters is the same, and sixth means for generating a second pulse having a 90° phase relationship with said first pulse, said fourth means thereby providing dual pulse outputs having a relative phase of 90° for sampling the generated reference sinusoidal waveform in accordance with the digital input information.

6. The converter according to claim 5 wherein said fifth means includes a $m$-bit comparator coupled to the first $m$ ($m$ least significant) outputs of each $n$-stage counter and a first $r$-bit comparator coupled to the output of said $m$-bit comparator and to the remaining $r$ outputs of each $n$-stage counter, and said sixth means includes a 90° adder stage coupled to said $r$ outputs of one of said $n$-stage counters and a second $r$-bit comparator coupled to the outputs of said adder stage and said $m$-bit comparator and further input-coupled to said $r$ outputs of the other of said $n$-stage counters.

7. The convertor according to claim 4 further including gating means coupled to the pulse outputs of said fourth means for providing output sampling pulses free from spurious pulses which may arise from the switching of the logic contained in said counters in response to the input information applied thereto.

* * * * *